April 25, 1967   J. H. SAKURADA   3,315,971
BELL AND SPIGOT JOINT
Filed May 2, 1966
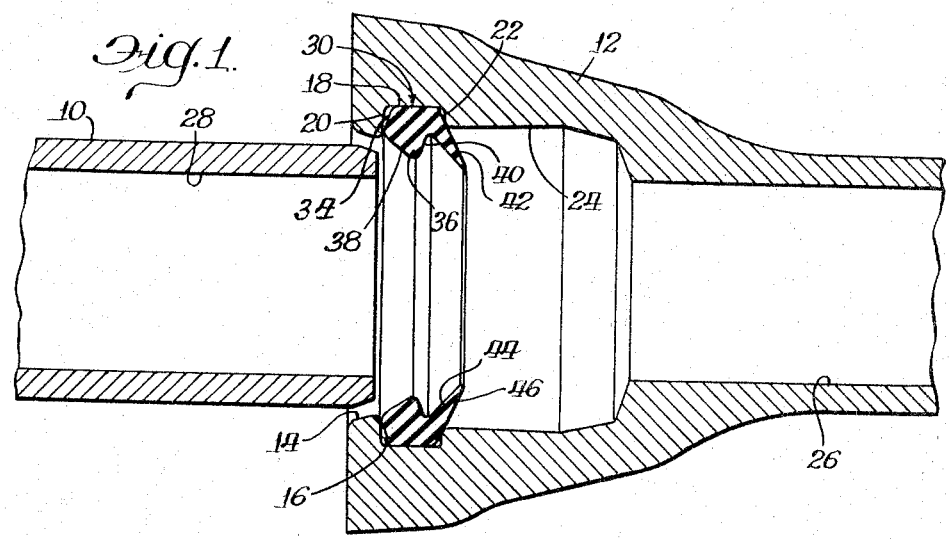
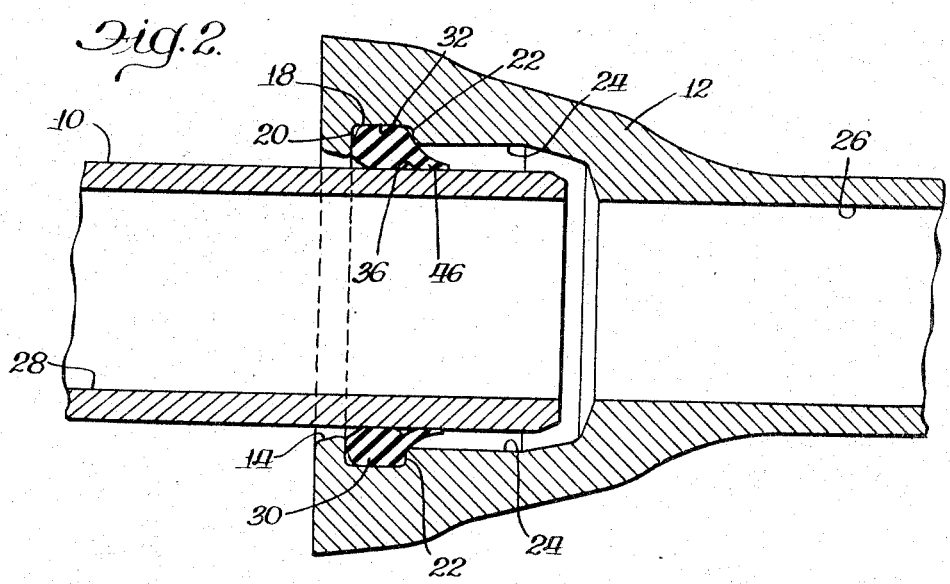
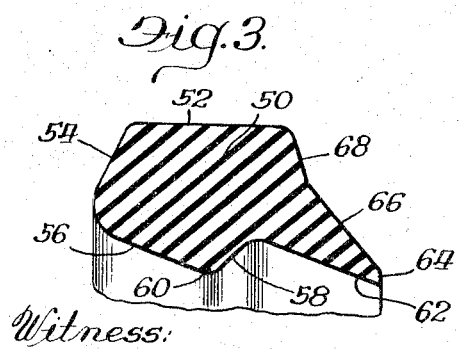
Witness:
INVENTOR.
Jim H. Sakurada
BY
Atty.

United States Patent Office 3,315,971
Patented Apr. 25, 1967

3,315,971
BELL AND SPIGOT JOINT
Jim H. Sakurada, Chicago, Ill., assignor to Amsted Industries Incorporated, Chicago, Ill., a corporation of New Jersey
Filed May 2, 1966, Ser. No. 546,634
4 Claims. (Cl. 277—207)

This invention relates to joints for bell and spigot type couplings, such as commonly used for pipe and fittings. This application is a continuation-in-part of my copending application Ser. No. 360,575, filed Apr. 17, 1964, now abandoned.

Briefly, the joint of this invention comprises a coupling of a bell and a cooperating spigot received in the bell. The bell comprises an annular lip projecting radially inwardly at an end thereof and also comprises an axially-elongated annular groove axially inwardly of the lip. Fitting within the groove is a novel resilient gasket having a main or body portion compressed tightly within the groove. The gasket is formed on the axially inner annular end thereof with an annular projection or tail that tapers radially inwardly from the body portion and has an inner end whose diameter is smaller than the diameter of the spigot, whereby as the spigot is forced through the gasket, the tail is placed under axial and circumferential tension from the main or body portion of the gasket to the end of the projection or tail remote from said main portion.

The projection is preferably more elastic than the main portion of the gasket so that the projection is readily placed in axial and circumferential tension as the spigot is pushed through the gasket whereby the projection tightly clamps the spigot. When high pressure fluid is in the bell inwardly of the gasket, the fluid acts upon the radially outer surface of the projection to clamp it against the spigot preventing any leakage of the fluid. This is the high pressure seal of the gasket. When the bell contains low pressure fluid it may sometimes seep along the radially inner surface of the projection until it reaches the main portion of the gasket which is under compression by the spigot affording a low pressure seal therearound.

These and further objects of this invention will become apparent from the following description thereof and the accompanying drawings in which:

FIGURE 1 is a sectional view of a bell and spigot pipe joint, embodying this invention, in pre-assembly position;

FIGURE 2 is a sectional view of an assembled bell and spigot joint of this invention; and FIGURE 3 is a partial sectional view of an alternative embodiment of a gasket of this invention.

Referring to FIGURE 1, which shows in pre-assembly position a pipe joint with a preferred embodiment of the novel gasket, the spigot 10 is about to enter the bell 12, which is formed with annular end wall or lip 14 having an inner diameter greater than the outer diameter of spigot 10 so that spigot 10 has just sufficient clearance with respect to lip 14 that it may freely enter bell 12.

Adjacent lip 14, the bell comprises an annular groove 16, which is defined by an axially extending annular wall 18, an axially outer end wall 20 on the inside of lip 14, and an axially inner end wall 22 remote from lip 14. In general, wall 18 is a substantially axially-extending wall and walls 20 and 22 are substantially radial walls. The term "substantially," as used herein to define a direction in which a wall extends, is meant to include angles within about 10 degrees from the horizontal or vertical (as positioned in the drawings) whichever the case may be. Preferably, wall 18 is parallel to the axis of bell member 12, while wall 22 is normal thereto, and wall 20 tapers axially outwardly from wall 18 at an angle of about 5 degrees.

Adjacent groove 16 is an axially extending wall 24, which is preferably coaxial with and spaced from spigot 10 when it is received within bell 12. Wall 24 is approximately a cylindrical wall, but is preferably flared at an angle of about 2 degrees to form a frusto-conical surface having a larger diameter at the end thereof remote from groove 16. The diameter of wall 24 (or the smaller diameter thereof when it is a frusto-conical surface as shown) is preferably greater than the opening of the bell defined by lip 14.

Seated within groove 16 is a main or body portion 30 of the novel gasket which is fabricated of a resilient or elastomeric material, e.g., natural rubber having a hardness of about 80 to 90 Durometer (A). Portion 30 has a radially outer annular wall 32 corresponding to the shape of annular wall 18 of groove 16. Wall 34 of portion 30, which is toward the low pressure side of groove 16, i.e., adjacent to lip 14, is preferably tapered outwardly from wall 32 at an angle greater than that at which wall 20 is tapered. The radially inner area of portion 30 comprises a first annular projection or ridge 36 defined by a wall 38 tapering axially inwardly from wall 34 and by a wall 40 tapering axially outwardly toward wall 38. The gasket also comprises an inwardly tapering sealing projection or tail 46 partly defined by a wall 44 tapering axially inwardly from wall 40 and merging therewith to define an annular groove. The tail is also partly defined by a wall 42 tapering axially inwardly from body portion 30 and merging with wall 44 to define an end of the tail 46 remote from the body portion 30. The tail preferably has a Durometer (A) value of the order of 45 to 55. The radially outer diameters of walls 38, 40, 42 and 44 are greater than the outer diameter of spigot 10, and the radially inner diameters of these walls are less than the outer diameter of spigot 10.

When spigot 10 is inserted into bell 12, gasket 30 is distorted to the form shown in FIGURE 2. Spigot 10 first encounters projection 36 to compress the main or body portion 30 within the annular space defined by spigot 10 and groove 16. As spigot 10 travels further into bell 12, it encounters and stretches sealing projection or tail 46 so that wall 44 bears against spigot member 10 and is in axial and circumferential tension from the portion 30 to the end of the tail 46 remote therefrom. The length of the projection or tail 46 is defined by the axial distance between the axially inner and outer circumferential lines defining the ends of wall 44 and as so defined is approximately equal to the length of the main or body portion 30 defined as the distance between the circumferential lines defining the axially outer end of wall 38 and the axially outer end of wall 44.

Reference is now made to FIGURE 3 which illustrates a partial sectional view of an alternative embodiment of the novel gasket. In FIGURE 3, it can be seen that the body portion 50 of the gasket is similar to that illustrated in FIGURES 1 and 2 since it is formed with outer annular wall 52 from which low-pressure end wall 54 tapers axially outwardly. Frusto-conically shaped inner annular walls 56 and 58 flare radially outwardly in opposite directions axially from projection 60 which serves to compress the main or body portion 50 of gasket within groove 16 (FIGURES 1 and 2) when it is encountered by spigot 10 entering bell 12. Inner wall 62 of wedge-shaped sealing projection or tail 64 flares axially outwardly toward end wall 54 and adjoins wall 58 to form an inner annular groove therebetween. Gasket 50 differs from gasket 30 illustrated in FIGURES 1 and 2 by outer frusto-conical wall 66 of projection 64 adjoining end wall 68 (on the high-pressure side of the gasket) at an obtuse angle rather than being an uninterrupted, continuous extension of the high-pressure end wall. As in the case of gasket 30, the outer diameter of the spigot with which gasket 50 is utilized is intermediate the minimum and maximum diameters of walls 56, 58, 62 and 66. The length of the projection or tail 64 is defined as the axial distance between the axially inner and outer circumferential lines defining the ends of wall 62 and is about four-fifths of the axial length of the main or body portion 52 defined as the axial distance between the circumferential lines defining the axially outer end of wall 56 and the axially outer end of wall 62. As in the embodiment of FIGURES 1 and 2, the tail is preferably softer and thus more elastic than the body portion 52. In each case the entire length of the tail along wall 46 or 66 is acted upon by high pressure fluid in the bell to clamp the tail against the spigot, thereby affording a high pressure seal axially inwardly of low pressure seal at 36 or 60. Also in each embodiment the inner end of the tail presents a much smaller surface than wall 42 or 66 against which the high pressure fluid acts to clamp the tail against the spigot.

Although this invention has been described with respect to specific embodiments, it will be apparent that obvious modifications may be made by one skilled in the art without departing from the intended scope of this invention as defined by the appended claims. For example, the gaskets of this invention may be fabricated of synthetic rubber or any other suitable resilient and radially deformable plastic material as well as natural rubber. The gasket can also include fiber or spring reinforcing.

I claim:
1. A joint for a bell and spigot coupling comprising a bell having an annular groove defined by an annular axially extending wall and axially spaced outer and inner radially extending end walls,
a spigot extending into said bell in radially spaced relationship therewith,
and an annular gasket made entirely of resilient material positioned between said bell and spigot,
said gasket comprising a main portion having a radially outer annular face engaged with the annular axially extending wall of the groove terminating in two axially spaced radially extending end walls engaged respectively with the outer and inner radially extending end walls of the groove and being compressed axially by the groove end walls,
said main portion having also a radially inner face engaged with the spigot and being compressed thereby to provide a low pressure seal adjacent the outer end wall of the bell,
said radially inner face of the main portion of the gasket being defined by frusto-conical wall portions intersecting in a radially inwardly projecting annular ridge bearing against the spigot,
and said gasket comprising also a high pressure sealing projection extending axially inwardly beyond said groove and bearing against the spigot and being defined by frusto-conical wall portions extending radially and axially inwardly from said main portion of the gasket and intersecting at the axially inner free end of the projection,
said main portion ridge and said axially inner free end of said projection having diameters smaller than that of the spigot,
and said projection being subjected by the spigot to axial and circumferential tension through its entire length and being acted upon through its entire length by high pressure fluid in the bell clamping it against the spigot to provide a high pressure seal around the spigot.

2. A joint according to claim 1 wherein the axial length of the projection is at least about four-fifths of the axial length of said main portion and wherein the axially inner free end of the projection presents a surface substantially smaller than the remaining surface of the projection acted upon by high pressure fluid in the bell.

3. A joint according to claim 1 wherein the projection is softer and more elastic than the main portion of the gasket.

4. A joint according to claim 1 wherein the projection and the main portion define an intervening groove encircling the spigot.

References Cited by the Examiner

UNITED STATES PATENTS

| | | | |
|---|---|---|---|
| 2,245,153 | 6/1941 | McWane | 285—110 X |
| 3,204,771 | 9/1965 | Baldwin | 285—110 X |

FOREIGN PATENTS

| | | |
|---|---|---|
| 1,129,344 | 5/1962 | Germany. |
| 594,113 | 5/1959 | Italy. |

LAVERNE D. GEIGER, *Primary Examiner.*

J. S. MEDNICK, *Assistant Examiner.*